US008950442B2

(12) United States Patent
Beebe

(10) Patent No.: US 8,950,442 B2
(45) Date of Patent: Feb. 10, 2015

(54) SYSTEM AND METHOD FOR ACCURATELY DELIVERING CONTROLLED AMOUNTS OF VISCOUS FLUID TO A FLUID DELIVERY DEVICE

(75) Inventor: W. Scott Beebe, Berkley, MA (US)

(73) Assignee: Fishman Corporation, Hopkinton, MA (US)

( * ) Notice: Subject to any disclaimer, the term of this patent is extended or adjusted under 35 U.S.C. 154(b) by 271 days.

(21) Appl. No.: 13/433,464

(22) Filed: Mar. 29, 2012

(65) Prior Publication Data
US 2012/0247612 A1 Oct. 4, 2012

Related U.S. Application Data

(60) Provisional application No. 61/469,910, filed on Mar. 31, 2011.

(51) Int. Cl.
*B65B 3/04* (2006.01)
*G01F 11/02* (2006.01)
*B65B 3/00* (2006.01)
*B65B 3/32* (2006.01)

(52) U.S. Cl.
CPC .............. *G01F 11/029* (2013.01); *B65B 3/003* (2013.01); *B65B 3/32* (2013.01)
USPC ....................... 141/27; 141/2; 141/5; 141/237

(58) Field of Classification Search
CPC ............ B65B 3/003; B65B 3/12; B65B 3/14; B65B 3/32
USPC .................. 141/2, 5, 25–27, 94–95, 234, 237
See application file for complete search history.

(56) References Cited

U.S. PATENT DOCUMENTS

| 4,091,969 | A | * | 5/1978 | Easter et al. ................. 222/309 |
| 4,842,026 | A | * | 6/1989 | Nordmeyer et al. ............ 141/1 |
| 4,917,158 | A | * | 4/1990 | Lingenhoff ................... 141/258 |
| 5,019,127 | A | * | 5/1991 | Bohm et al. .................... 222/1 |

(Continued)

FOREIGN PATENT DOCUMENTS

| EP | 0839716 A1 | 5/1998 |
| EP | 0851217 A2 | 7/1998 |

(Continued)

OTHER PUBLICATIONS

International Search Report and Written Opinion of International Searching Authority mailed Jul. 9, 2012 in corresponding PCT Application No. PCT/US2012/031087.

*Primary Examiner* — Nicolas A Arnett
(74) *Attorney, Agent, or Firm* — Dingman, McInnes & McLane, LLP

(57) ABSTRACT

A system (10) and method for accurately delivering controlled amounts of viscous fluid to one or more fluid delivery devices (31). There is a fluid reservoir (12), a variable-volume fill chamber (18), and structure (171, 173) that fluidly interconnects the reservoir (12) to the fill chamber (18). Valving (22) is used to channel fluid flow from the reservoir (12) to the fill chamber (18). There is a device (20) that dispenses fluid from the fill chamber (18). Valving (24) is used to channel fluid flow from the fill chamber (18) to a fluid delivery device (31). A controller (28) automatically controls operation of the device (20) that dispenses fluid from the fill chamber (18), and may also control operation of the valving (22, 24).

17 Claims, 10 Drawing Sheets

(56) References Cited

U.S. PATENT DOCUMENTS

| | | |
|---|---|---|
| 5,022,556 A | 6/1991 | Dency |
| 5,309,955 A * | 5/1994 | Torterotot ............ 141/1 |
| 5,524,797 A * | 6/1996 | Schultz, Sr. ............ 222/334 |
| 5,785,098 A * | 7/1998 | Sern et al. ............ 141/27 |
| 5,823,389 A * | 10/1998 | Guzowski ............ 222/1 |
| 5,911,252 A | 6/1999 | Cassel |
| 6,676,642 B2 | 1/2004 | Beebe |
| 7,681,606 B2 * | 3/2010 | Khan et al. ............ 141/147 |
| 7,784,500 B2 * | 8/2010 | Hirahara ............ 141/8 |
| 2001/0029354 A1 * | 10/2001 | Rolle et al. ............ 604/218 |
| 2008/0035234 A1 * | 2/2008 | Khan et al. ............ 141/27 |
| 2011/0049192 A1 | 3/2011 | Lee |

FOREIGN PATENT DOCUMENTS

| | | |
|---|---|---|
| EP | 0994333 A1 | 4/2000 |
| WO | WO 2005/123162 A1 | 12/2005 |

* cited by examiner

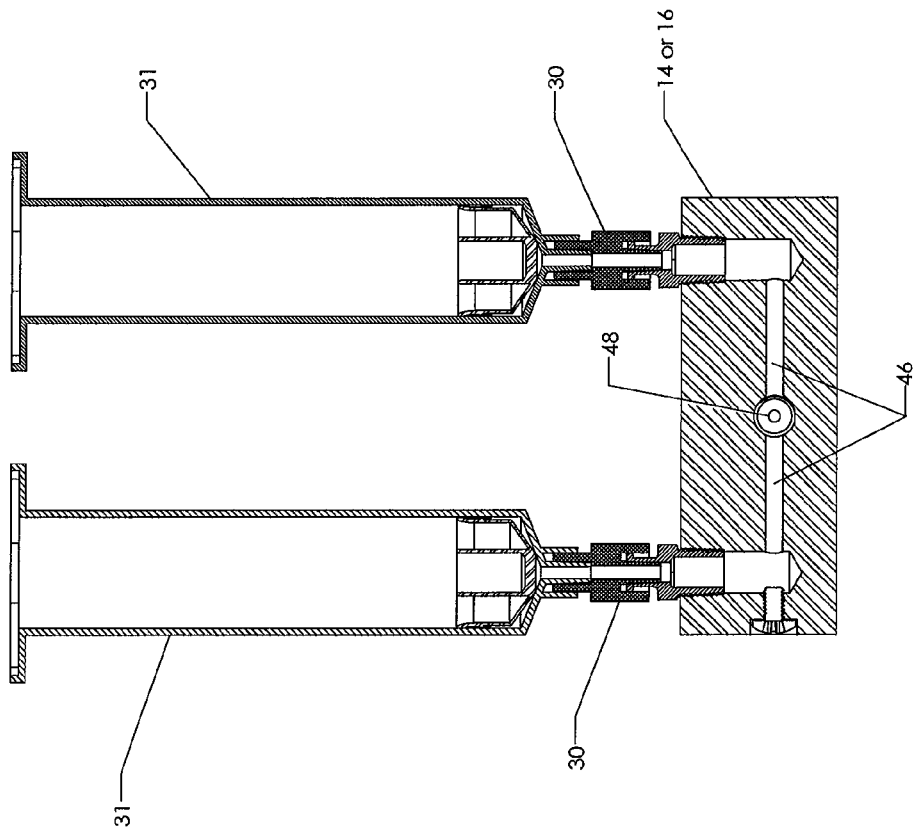
Section A-A
Figure 3c
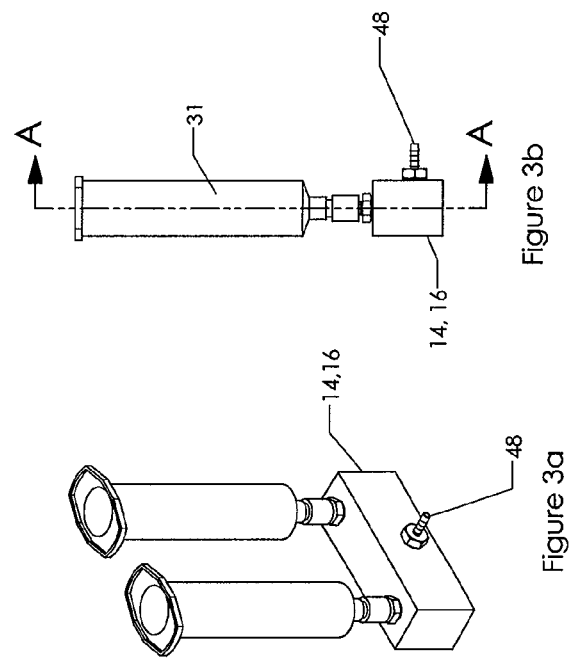
Figure 3b
Figure 3a

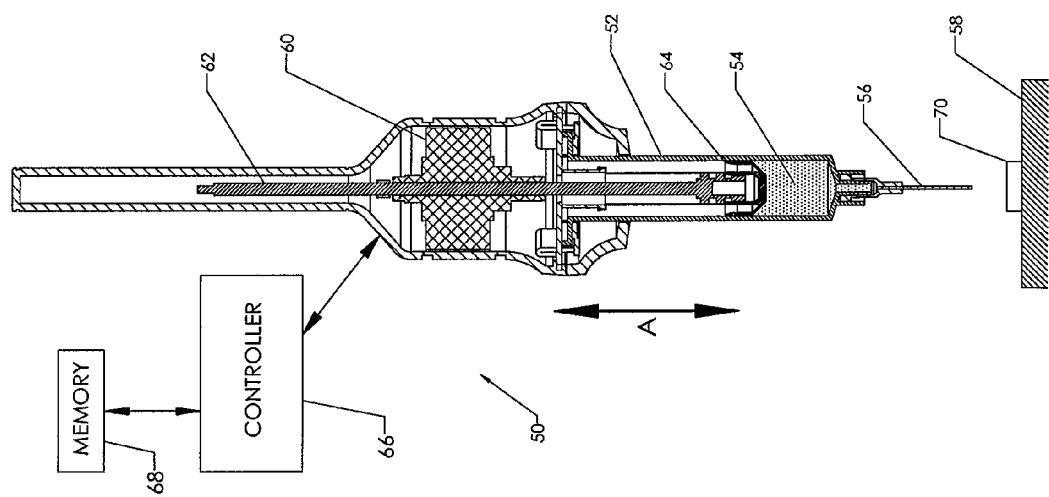

SYSTEM AND METHOD FOR ACCURATELY DELIVERING CONTROLLED AMOUNTS OF VISCOUS FLUID TO A FLUID DELIVERY DEVICE

CROSS-REFERENCE TO RELATED APPLICATION

This application claims priority of Provisional Application Ser. No. 61/469,910, filed on Mar. 31, 2011, the disclosure of which is incorporated herein by reference.

FIELD

This disclosure relates to the delivery of viscous fluid to a fluid dispenser.

BACKGROUND

There are many situations in which it is desirable to dispense small controlled amounts of fluid in a specific location. One example is the dispensing of an adhesive in an automated production line, such as dispensing a fraction of a milliliter of UV-cured adhesive at the base of the needle of a hypodermic assembly where the adhesive is cured so as to hold the needle in place in the plastic base. There are myriad other situations in which small controlled amounts of fluid need to be dispensed very exactly.

In a production environment it is desirable to have as few interruptions as possible to an automated assembly line. One interruption occurs when a fluid dispenser needs to be refilled or replaced; the line must be halted, the fluid dispenser removed, and a full dispenser placed properly into position. Many assembly lines uses several fluid dispensers, each of which needs to hold fluid. This situation leads to the need to stop production fairly frequently so as to replace empty fluid dispensers. It is thus desirable to design the fluid dispensing system in a manner that allows the fluid dispensers to be replaced as quickly as possible.

Adhesives are dispensed from syringes in various industrial operations. It is desirable to pre-fill syringes with a known volume of fluid at a production location separate from the fluid dispensing operation. This way as syringes are emptied in the fluid dispensing operation, they can quickly and easily be replaced with properly filled syringes. Also, when multiple dispense guns are used in one system and all of the syringes are prefilled with the same amount of fluid, they all run out of fluid at the same time; this keeps reloading down time to one machine stop. This is possible due to the stepper motor and all syringes being filled to the exact same height (volume). The result is less production down time and less waste of fluid due to syringes not being completely emptied.

SUMMARY

In general, one aspect of the disclosure features a system for accurately delivering controlled amounts of viscous fluid from a fluid reservoir to one or more fluid delivery devices. The system comprises a variable-volume fill chamber that defines a cavity that is adapted to contain the fluid, a movable plunger in the fill chamber cavity that can be moved within the cavity to vary the effective volume of the cavity, structure fluidly interconnecting the reservoir to the fill chamber, a device that automatically moves the plunger so as to dispense fluid from the fill chamber, structure fluidly interconnecting fluid flowing from the fill chamber to one or more fluid delivery devices, and a controller that automatically controls operation of the device that moves the plunger, to dispense a predetermined amount of fluid from the fill chamber to the fluid delivery devices. The fluid delivery devices may comprise syringes, and the fluid may be an adhesive to be dispensed from the syringes. The system may further comprise a syringe stand with one or more syringe locations. The syringe stand is constructed and arranged to releasably hold a plurality of syringes to be filled, and has a luer-activated valve associated with each syringe location. The syringe stand may have a body and a plurality of luer-activated valves in the body in fluid communication with a fluid passage in the body, wherein the fluid passage terminates at two separate openings in the body, one used as a fluid inlet and one used as a fluid outlet.

The system may further comprise a compressed air assist for conveying fluid from the reservoir to the fill chamber. The device that moves the plunger may comprise a stepper motor with an output shaft that is adapted to be mechanically coupled to the plunger. The system may further comprise valving used to selectively allow and prevent fluid flow to and from the fill chamber, wherein the controller also automatically controls operation of some or all of the valving. The plunger may define a plunger body that carries a seal proximate its distal end that is located in the fill chamber cavity, a passageway in the plunger body that begins distally of the seal and terminates proximally of the seal, and a selectively-operable valve in the passageway, wherein the valve can be opened to allow air to be bled from the cavity. The selectively-operable valve may be a luer-activated valve. The plunger may define a releasable coupling at its proximal end that is adapted to be coupled to the device that moves the plunger.

The structure fluidly interconnecting the reservoir to the fill chamber, the structure fluidly interconnecting fluid flowing from the fill chamber to one or more fluid delivery devices, the fill chamber, and the plunger, may all be part of an interconnected fluid handling assembly. The system may further comprise a support structure that releasably supports and holds the fluid handling assembly such that it can be removed and replaced from the system as a unit.

Further featured herein is a system for accurately delivering controlled amounts of viscous fluid from a fluid reservoir to one or more fluid delivery devices. The system comprises a variable-volume fill chamber that defines a cavity that is adapted to contain the fluid, and a movable plunger in the fill chamber cavity that can be moved within the cavity to vary the effective volume of the cavity. The plunger defines a plunger body that carries a seal proximate its distal end that is located in the fill chamber cavity. There is a passageway in the plunger body that begins distally of the seal and terminates proximally of the seal. There is a selectively-operable valve in the passageway; the valve can be opened to allow air to be bled from the cavity. The plunger defines a releasable coupling at its proximal end. There is structure fluidly interconnecting the reservoir to the fill chamber. There is a stepper motor with an output shaft that is adapted to be mechanically coupled to the releasable coupling of the plunger, wherein the stepper motor is adapted to be automatically controlled to move the plunger so as to dispense fluid from the fill chamber. There is structure fluidly interconnecting fluid flowing from the fill chamber to one or more fluid delivery devices, and valving used to selectively allow and prevent fluid flow to and from the fill chamber. There is a controller that automatically controls operation of the device that moves the plunger and also automatically controls operation of some or all of the valving, to dispense a predetermined amount of fluid from the fill chamber to the fluid delivery devices. The structure fluidly interconnecting the reservoir to the fill chamber, the structure fluidly interconnecting fluid flowing from the fill chamber to one or more fluid delivery devices and the fill chamber, and the plunger, are all part of an interconnected fluid handling assembly. There is a support structure that releasably supports and holds the fluid handling assembly such that it can be removed and replaced from the system as a unit.

Further featured herein is a method of accurately delivering controlled amounts of viscous fluid from a fluid reservoir to one or more fluid delivery devices. The method comprises the steps of: (i) providing a fluid fill system comprising a variable-volume fill chamber that defines a cavity that is adapted to contain the fluid, a movable plunger in the fill chamber cavity that can be moved within the cavity to vary the effective volume of the cavity, structure including one or more valves fluidly interconnecting the reservoir to the fill chamber, a stepper motor that is controlled to automatically move the plunger so as to dispense fluid from the fill chamber, structure including one or more valves fluidly interconnecting fluid flowing from the fill chamber to one or more fluid delivery devices, and a controller that automatically controls operation of the stepper motor and at least some of the valves; (ii) using the controller to automatically control the valves so as to open valves used to channel fluid flow from the reservoir to the fill chamber and at the same time close valves used to channel fluid flow from the fill chamber to a fluid delivery device, and once the fluid delivery device has been filled close valves used to channel fluid flow from the reservoir to the fill chamber, and then open valves used to channel fluid flow from the fill chamber to a fluid delivery device; and (iii) while the valves used to channel fluid flow from the fill chamber to a fluid delivery device are open, using the controller to operate the stepper motor to move the plunger to expel fluid from the fill chamber, so as to move fluid into the fluid delivery devices.

The plunger may define a plunger body that carries a seal proximate its distal end that is located in the fill chamber cavity. There may also be a passageway in the plunger body that begins distally of the seal and terminates proximally of the seal, and a selectively-operable valve in the passageway, wherein the valve can be opened to allow air to be bled from the cavity. The selectively-operable valve may be a luer-activated valve. The plunger may define a releasable coupling at its proximal end that is adapted to be coupled to the output shaft of the stepper motor. The structure fluidly interconnecting the reservoir to the fill chamber, the structure fluidly interconnecting fluid flowing from the fill chamber to one or more fluid delivery devices, the fill chamber, and the plunger, may all be part of an interconnected fluid handling assembly. The fluid fill system may further comprise a support structure that releasably supports and holds the fluid handling assembly such that it can be removed and replaced from the system as a unit.

BRIEF DESCRIPTION OF THE DRAWINGS

FIGS. 3a, 3b and 3c are perspective, side and cross-sectional views, respectively, of two syringes and a syringe stand for a system that accurately delivers a controlled amount of viscous fluid to a fluid delivery device.

FIG. 4 shows a system that delivers fluid from a fluid delivery device, and includes a detailed cross-sectional view of a fluid delivery device that can be used with a disclosed system and method that accurately delivers a controlled amount of viscous fluid to a fluid delivery device.

DETAILED DESCRIPTION

Figure 1:
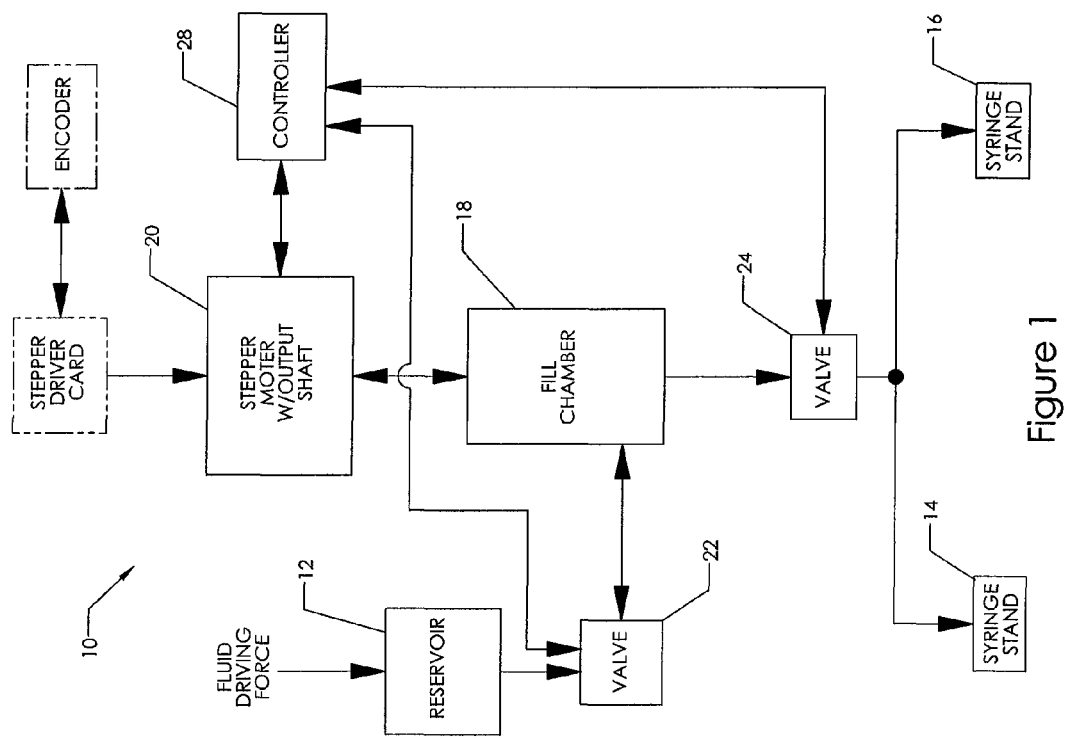
FIG. 1 is a schematic block diagram of a system that accurately delivers a controlled amount of viscous fluid to a fluid delivery device. The system may also be used to practice a method that accurately delivers a controlled amount of viscous fluid to a fluid delivery device.

The embodiments depicted in the drawings accomplish a system and method that accurately delivers a controlled amount of viscous fluid to a fluid delivery device. In one example the fluid delivery device is a syringe. In another example the fluid delivery device is a fluid dispenser such as a dispensing tip (e.g., a syringe needle). The system can have a fluid reservoir, a variable-volume fill chamber, and structure fluidly interconnecting the reservoir and the fill chamber that is used to convey a defined volume of fluid from the reservoir to the fill chamber. There are one or more fluid delivery devices to be either filled with the fluid from the fill chamber or supplied with fluid from the fill chamber. There may be one or more structures that each hold one or more fluid delivery devices to be filled. A stepper motor driven plunger can be operated to dispense the fluid from the fill chamber. Valving is used to channel fluid flow from the reservoir to the fill chamber, and valving is used to channel fluid flow from the fill chamber to the one or more fluid delivery devices. A controller automatically controls operation of the stepper motor. The controller may also automatically control the valving. The fluid may be a viscous adhesive. The fluid may be dispensed from syringes that are filled, or may be dispensed directly from dispensing tips. The fluid flow from the reservoir to the fill chamber may be enabled via a compressed air assist that pushes viscous fluid through lines, tubing, pipes or other similar liquid-conveying structures such as lines or plumbing.

FIG. 1 is a schematic block diagram of an embodiment of a system 10 for accurately filling syringes with fluid; in this case the syringes are typically to be used as the fluid delivery devices. The fluid is typically a viscous fluid such as an adhesive, but it need not be viscous and it need not be an adhesive. Adhesives are dispensed from syringes or dispense tips in various industrial operations. When syringes are used, it is desirable to pre-fill syringes with a known volume of fluid at a production location separate from the fluid dispensing operation. This way as syringes are emptied in the fluid dispensing operation, they can quickly and easily be replaced with properly filled syringes. Also, when multiple dispensing locations are used in one system and all of the syringes are prefilled with the same amount of fluid they all run out of fluid at the same time, which keeps reloading down time to one machine stop. This is possible due to the stepper motor and all syringes being filled to the exact same height (volume). The result is less production down time and less waste of fluid due to syringes not being completely emptied.

System 10, FIG. 1, accomplishes filling of a defined amount of fluid held in reservoir 12 into fill chamber 18. Fluid is then delivered (metered) from chamber 18 to syringes, or directly to dispense tips. When used, each syringe stand 14 and 16 (see details in FIG. 3) holds one or more syringes in a manner that allows them to be filled. Typically a syringe stand 14 or 16, FIG. 3, includes one or more luer activated valves 30 and/or other fill port components to which a syringe 31 can be fluidly coupled quickly and easily. The luer activated valve closes the fill line when a syringe is not present and automatically opens the fill line when a standard syringe with luer lock is coupled to the syringe stand via the valve.

Reservoir 12 typically holds enough fluid to fill the fill chamber 18 more than one time. Many times syringes to be filled have a volume of from 3 to 30 milliliters. Reservoir 12 may typically have a volume of from 1 to 5 liters, or the system can be connected to a separate fluid pumping system with a larger reservoir, such as a 5 gallon to 55 gallon reservoir. The volumes of the syringes and of the reservoir and of the fill chamber is not a limitation, however, as the technology can be applied in other situations.

Fill chamber 18 is essentially an intermediate reservoir that is adapted to hold a defined amount of fluid drawn from reservoir 12. Typically all of the fluid in fill chamber 18 is then delivered from fill chamber 18 to one or more syringes in one or more syringe stands, or it is metered out under automatic control directly to one or more fluid dispensing tips. However, the disclosure also contemplates filling one or more fluid delivery devices with less than all the fluid in fill chamber 18. The disclosure also contemplates filling one or more fluid delivery devices with a volume that comprises more than one volume of fill chamber 18.

Fluid flowing from reservoir 12 to fill chamber 18, and then from fill chamber 18 to the syringe(s) to be filled or to the dispense tips, is directed by valves 22 and 24. The valves can be operated manually, or one or more of them can be under automatic control of microprocessor controller 28. They may also be driven with a stepper motor driver (not shown). An encoder could be added for verification of step movement.

Fluid is preferably moved from reservoir 12 to fill chamber 18 as follows. Pressurized air or another source of pressure is applied to reservoir 12 as a fluid driving force to force the viscous fluid through valve 22 which has been opened by controller 28 (valve 24 has been closed by controller 28 for this phase) to move fluid into chamber 18. Chamber 18 typically has an internal cavity of well defined volume. The effective volume to be filled with fluid can be varied via a movable plunger in the cavity. The location of the plunger is controlled by a stepper motor 20 with an output shaft. In one example, fill chamber 18 comprises a thirty milliliter cavity 38, see FIG. 2. Cavity 38 can (may or may not) be a replaceable/disposable reservoir that inhibits cross contamination when fill chamber 18 is sequentially used for different fluids. These reservoirs can be made of a material such as stainless steel, Teflon, Acetyl, and Delrin or others. The reservoir also helps to prevent build up of fluid or hardened fluid in cavity 18, particularly if the fluid is a substance that either hardens over time or has sufficient viscosity that it can build up in the walls of the cavity.

The stepper motor 20 moves in steps or increments, the number of which is directly proportional to the speed of the motor; which in turn is directly proportional to the frequency of the pulses from the driver. For example, the speed of stepper motor 20, receiving pulses at a rate of 1000 Hz, is 300 rpm.

In this example, the leadscrew, which is an integral part of stepper motor 20, moves an engaged nut and the output shaft in increments of 0.000625 inches per step at the rate of 1000 steps per second. With a thirty milliliter cavity, each step corresponds to a volume of about 0.005 ml.

In one non-limiting example, there are a series of three dispense guns (stepper motors) that can each operate syringes with volumes of 3, 5, 10 and 30 ml. One dispense gun (the "SDAV" gun) has a travel of 0.000125" per step. A second gun (the "MDAV" gun) has a travel of twice that of the SDAV or 0.00025" per step. A third gun (the "LDAV" gun) has a travel of twice that of the MDAV, or 0.0005" per step. The information below indicates the volume per step for each of the four syringe volumes, for each of these three dispense gun models.

SDAV Dispensing Gun 1 step with a 3 cc syringe barrel will yield 0.00023 cc of fluid dispensed.

1 step with a 5 cc syringe barrel will yield 0.00039 cc of fluid dispensed.

1 step with a 10 cc syringe barrel will yield 0.00065 cc of fluid dispensed.

1 step with a 30 cc syringe barrel will yield 0.00129 cc of fluid dispensed.

MDAV Dispensing Gun 1 step with a 3 cc syringe barrel will yield 0.00045 cc of fluid dispensed.

1 step with a 5 cc syringe barrel will yield 0.00079 cc of fluid dispensed.

1 step with a 10 cc syringe barrel will yield 0.00131 cc of fluid dispensed.

1 step with a 30 cc syringe barrel will yield 0.00257 cc of fluid dispensed.

LDAV Dispensing Gun 1 step with a 3 cc syringe barrel will yield 0.00090 cc of fluid dispensed.

1 step with a 5 cc syringe barrel will yield 0.00158 cc of fluid dispensed.

1 step with a 10 cc syringe barrel will yield 0.00261 cc of fluid dispensed.

1 step with a 30 cc syringe barrel will yield 0.00514 cc of fluid dispensed.

System 10 and stepper motor 20 are also capable of operation in a micro-stepping mode, which permits a much finer resolution and smoother operation, but at the cost of slower speed.

In operation, chamber 18 remains closed to the entrance of any fluid until after the fluid driving force has been applied to reservoir 12. Running a volume/height algorithm, the controller 28 then reverses the direction of rotation of stepper motor 20, retracting the coupled output shaft and plunger 36, see FIG. 2, at a rate comparable to the fluid flow rate from reservoir 12, to the precise height that results in the desired volume that is ultimately to be delivered to the syringe(s) or dispense tip(s). The fluid fills cavity 38 behind plunger 36 as the plunger is retracted. This prevents voids from occurring in the cavity that will adversely affect the accuracy of the volumetric output. Fill chamber 18 features a vented cap 39, FIG. 2. The vents in cap 39 are above the plunger to permit ease of retraction and extension while assuring that cavity 38 remains completely air and void free. If using a driver the required fill height is calculated and set manually.

Delivery of the desired volume of fluid from fill chamber 18 to one or more syringes or one or more other dispensers such as dispense tips would typically be accomplished as follows. Controller 28 closes valve 22 and opens valve 24. Controller 28 then operates stepper motor 20 to move the shaft down. (Controller 28 moves the shaft up to fill and down to dispense) such that the plunger moves towards the outlet 42 of cavity 38, thereby expelling the fluid through valve 24. The fluid can then move to syringe stand 14 and/or syringe stand 16, FIG. 3. The output of valve 24 is connected in a volumetrically balanced manner to its outputs, e.g., to syringe stand 14 and/or syringe stand 16, to assure an exactly even distribution of fluid to the syringe(s) or other dispenser(s). When only a single syringe is being filled, the luer activated valves 30 attached to each filling port on syringe stand 14 and syringe stand 16 automatically act as flow preventers. In this condition, controller 28 directs stepper motor 20 to only advance the actuator the sufficient number of steps (distance) necessary to dispense the corresponding volume.

If more than one fill chamber volume is to be delivered to one or more syringes, the controller causes the stepper motor to advance the plunger to expel all of the fluid from cavity 38. The process is then repeated to achieve a desired total volume delivered.

Figure 2:
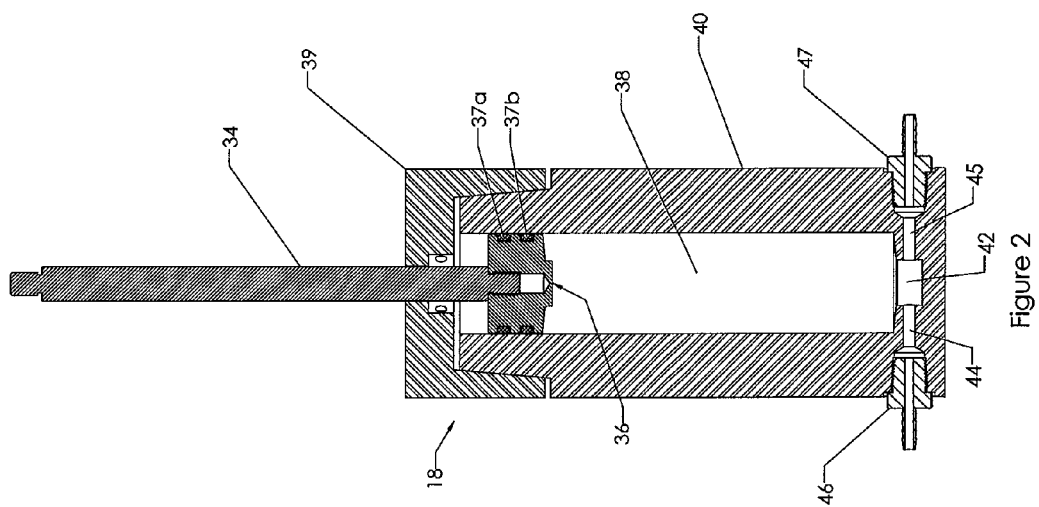
FIG. 2 is an enlarged cross-sectional view of a fill chamber for a system that accurately delivers a controlled amount of viscous fluid to a fluid delivery device.

One non-limiting embodiment of fill chamber 18 is shown in FIG. 2. Cavity 38 is created in structure or body 40. Passage 42 and further passages 44 and 45 direct fluid into and out of cavity 38. Fittings and/or integral features 46 and 47 provide connections for attaching tubing or other fluid conveyance structures to structure 40 to permit the flow of fluid into and out of passages 42, 44, and 45. Plunger 36 carries one or more O rings or other seals (37*a*, 37*b*) and is located in cavity 38 at the distal end of plunger actuator shaft 34 that is coupled to the output shaft of stepper motor 20.

An embodiment of syringe stands 14 or 16 is shown in FIGS. 3*a*, 3*b* and 3*c*, where FIG. 3*c* is a cross-sectional view taken along line A-A of FIG. 3*b*. Passage 46 directs fluid in a volumetrically balanced manner from inlet fittings and/or integral features 48, providing a connection for attaching tubing or other fluid conveyance devices, to luer activated valves 30 and/or other fill port components to which a syringe 31 can be fluidly coupled. Fluid flows from fill chamber 18 into syringes 31, filling them to the predetermined volume/height.

FIG. 4 depicts system 50 for delivering fluid from a previously-filled syringe 52 to device 70 located on surface 58. This is but one type of fluid delivery device contemplated herein. Syringe 52 has chamber filled with fluid 54, and plunger 64 that is moved via leadscrew 62 up and down in the direction of arrow "A" by stepper motor 60. Controller 66 operates stepper motor 60. Digital memory 68 can be a removable memory card that is adapted to be used to provide operating information to controller 66. Alternatively, controller 66 and memory 68 can be accomplished by a microprocessor. The microprocessor can be but need not be networked to receive operating information. The operating information may comprise the number of steps that are needed to be accomplished by stepper motor 60 to dispense a defined amount of fluid 54 through dispensing tip (hypodermic needle) 56.

In order to fully utilize all of the fluid in the fluid dispenser while not affecting production due to attempted dispensing from an empty syringe, controller 66 must know the exact volume of fluid in syringe 52. Also, before the first dispense operation, the fluid must fill the entire dispense tip 56 such that a single small step of motor 60 accomplishes dispensing of fluid. In other words, there must be no air in the system that is either compressed or pushed out ahead of fluid before the first drop is dispensed. To accomplish this, system 50 may be loaded through memory 68 with the number of steps that motor 60 can be operated in order to fully empty fluid 54 from syringe 52.

In an alternative embodiment, system 10 can do away with fluid dispensers such as syringes, and the syringe stands, and the fluid can be delivered directly from the fill chamber to the location where the fluid is to be utilized (e.g., device 70), for example by a dispense tip rather than a syringe. As long as the cavity of the fill chamber and the lines between it and the dispensing location do not contain air voids or other compressible fluids, operation of stepper motor 20 can be controlled to deliver a desired amount of fluid to a dispense tip (e.g., a nozzle or a hypodermic needle), in the same manner as described above relative to stepper motor 60.

The described embodiments are not limiting but rather are supportive of the claims. Other embodiments and options are also contemplated within the scope of the claims. The dispensing chambers and dispensing tips can take different forms than those shown and described herein, both as currently known in the art or developed in the future. Also, when a fluid dispenser is used, it need not be a syringe, nor does it need to be operated by a stepper motor. A dispenser can be operated by any currently known or future developed means, such as air-powered or positive displacement as currently known in the art.

Figure 5:
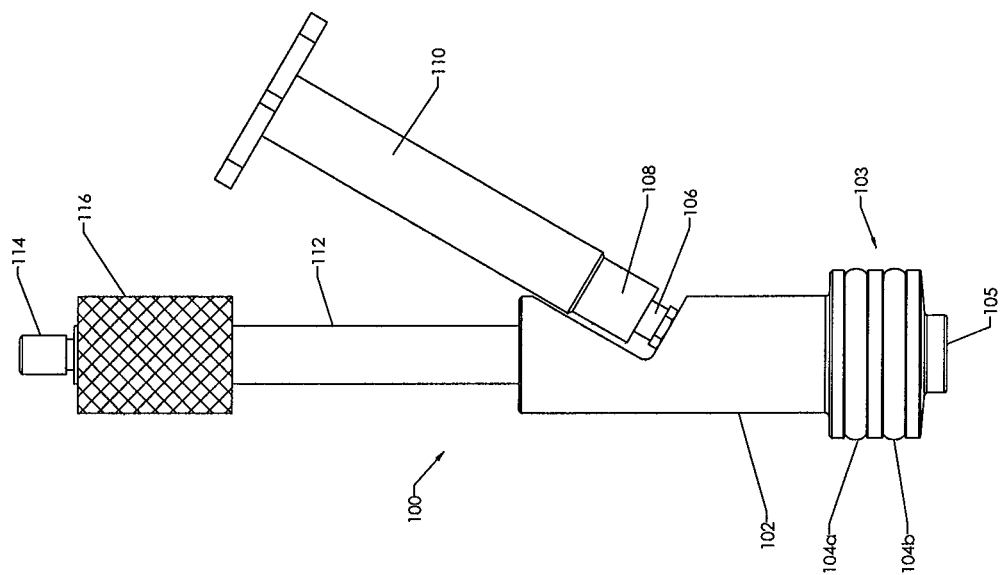
FIG. 5 shows a different plunger.

Another embodiment is shown in FIGS. 5 through 9. FIG. 5 shows an alternative embodiment of a plunger 100 for a fill cavity, such as the fill cavity shown in FIG. 2 and the fill cavity shown in this second embodiment. Plunger 100 comprises sealing end 103 that is designed to fit into the fill chamber cavity and in this embodiment carries two O-rings 104*a* and 104*b* that seal against the walls of the chamber to keep liquid below them. Structure 103 is carried at the end of structure 102 that is itself carried at the end of shaft 112 that has coupling 114 at the top end that can be moved clockwise and counter clockwise through knurled knob 116 to allow the plunger to be coupled and decoupled from the stepper motor. One difference of this plunger over the previous plunger is the manner in which air is evacuated via the plunger. In this case, structure 102 comprises an internal passageway (not shown) that is open to end 105. Luer-activated valve 106 is located at the other end of this passageway. Coupling portion 108 allows a luer-lock carrying hypodermic body 110 to be coupled to structure 102 via valve 106. When this coupling occurs, there is an airflow path from opening 105 into the empty hypodermic body 110. This arrangement allows air in the fill chamber cavity to be evacuated via the passageway as the cavity is filled with fluid for the first time. Once all of the air has been evacuated, body 110 can be removed which closes valve 106 and thus maintains the air-free environment in the fill chamber.

Figure 6:
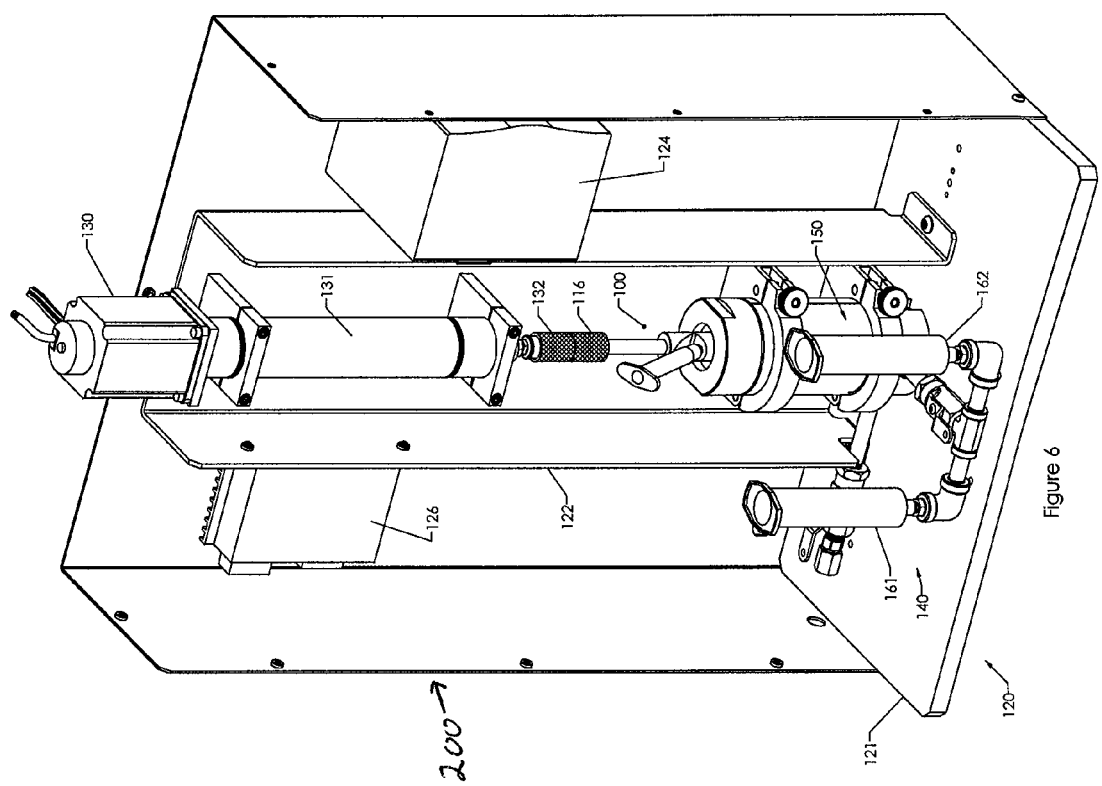
FIG. 6 illustrates a system that uses the plunger of FIG. 5.

FIG. 6 shows system 120 that employs the fill chamber arrangement shown in FIG. 5. Stepper motor 130 with lead screw in housing 131 and distal coupling 132 is mechanically coupled to coupling 116. Physical enclosure 200 is shown without a front cover or a top cover. This enclosure is not necessary to the operation of the system but does act to both anchor and protect the system in this embodiment. Base 121 is part of enclosure 200 as is supporting flange member 122. Power supply 126 and programmable logic controller (PLC) 124 are also shown. Fluid-handling assembly 140, shown in more detail in following drawings, comprises the fluid handling hardware that in this embodiment is easily replaced as a unit, to allow the embodiment to be used to handle different types of fluids. This drawing shows a syringe stand holding syringes 161 and 162, although as described above the fill chamber can alternatively be used to directly feed dispensing tips or other devices that dispense the fluid that is metered out of the fill chamber. Support assembly 150 comprises a support structure for the fill chamber and assembly 140, also as shown in more detail below.

Figure 7:
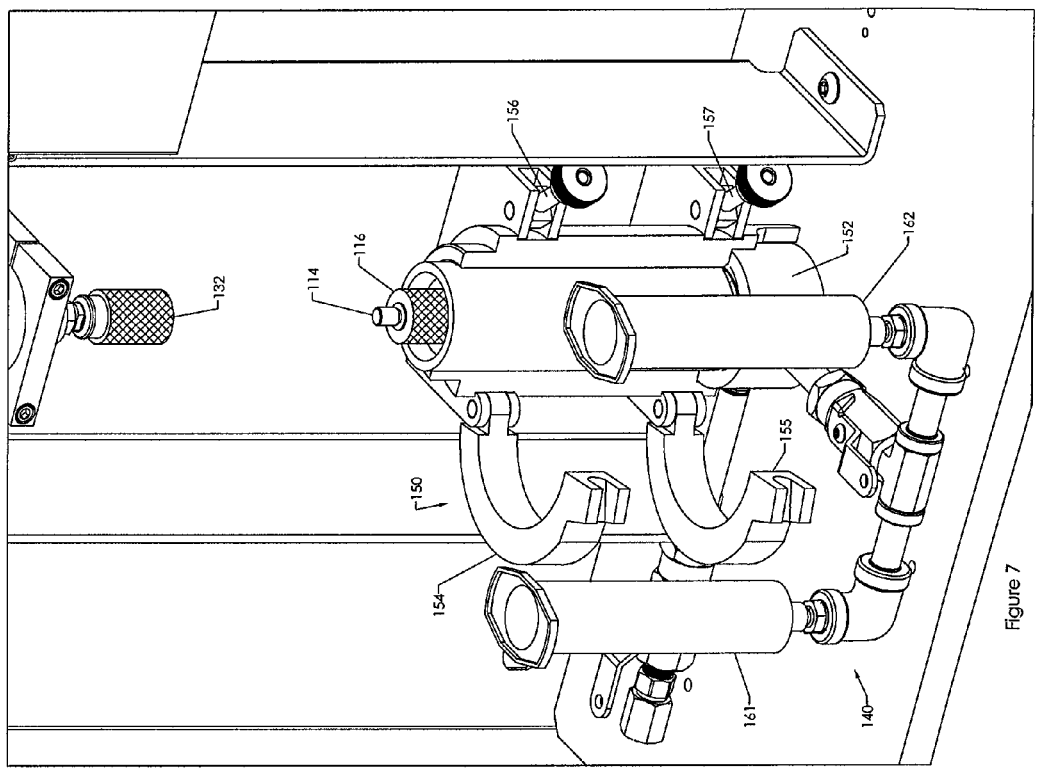
FIG. 7 shows a portion of the system of FIG. 6, partially disassembled.
Figure 8:
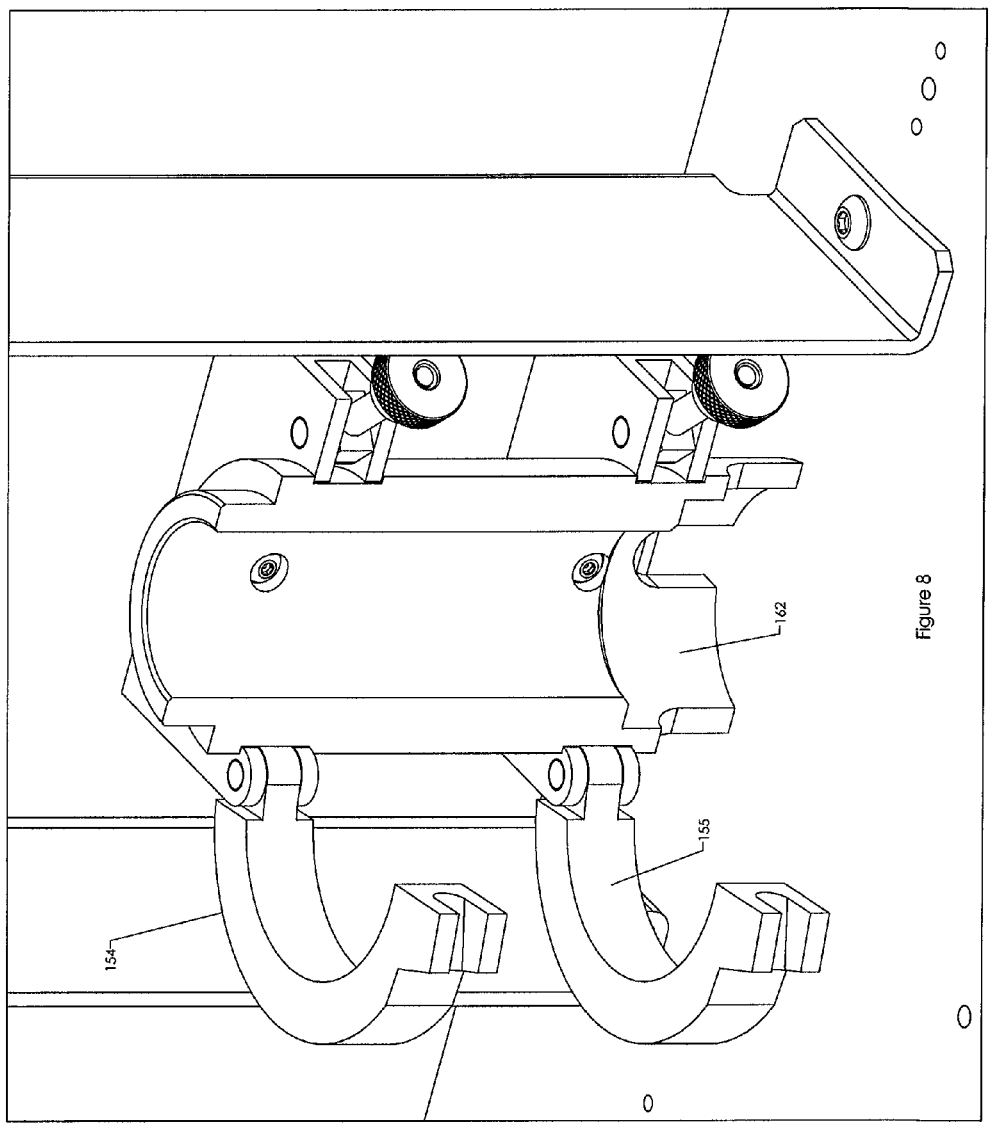
FIG. 8 shows a portion of FIG. 7 further disassembled.
Figure 9:
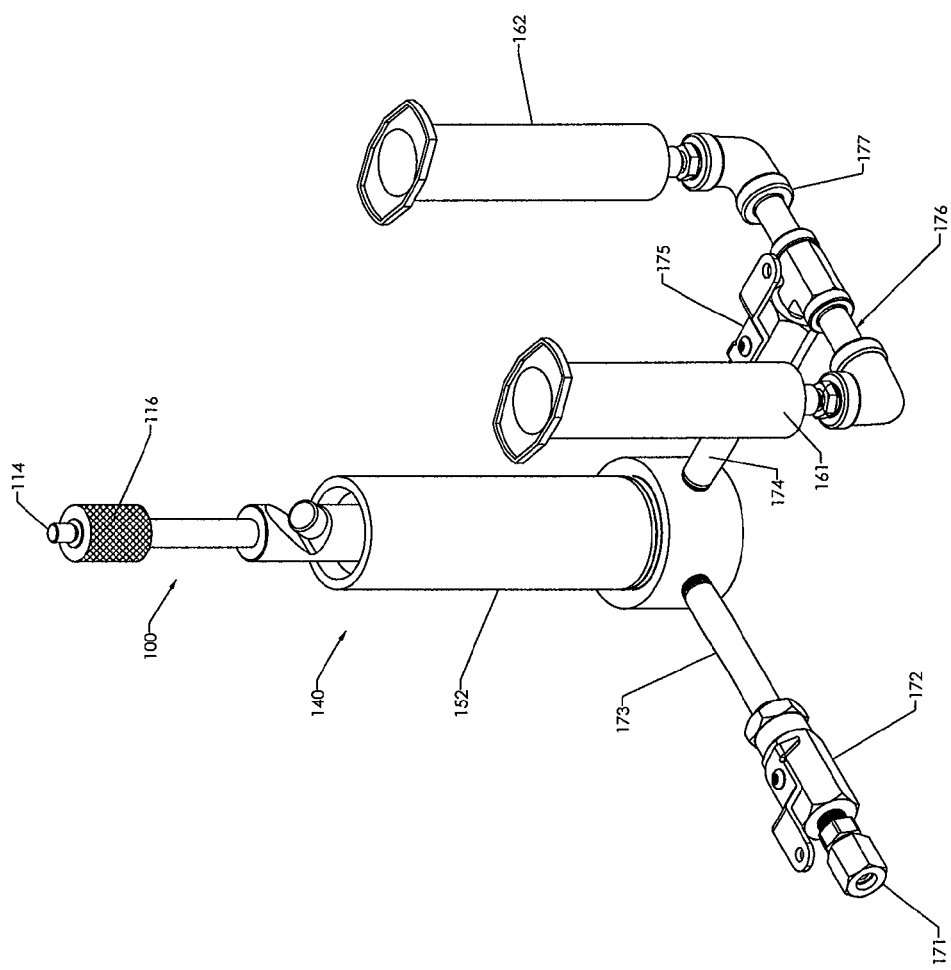
FIG. 9 shows the replaceable wettable structure of the system of FIG. 6.

Assemblies 140 and 150 are shown in more detail in FIGS. 7 through 9. Assembly 140 comprises fill chamber 152 that includes plunger assembly 100. Fluid inlet 171 is coupled to a larger reservoir or fluid supply as described above. Valve 172 can be closed to facilitate removal and replacement of assembly 140. Pipe or tube 173 leads into chamber 152. Pipe or tube 174 is the outlet of chamber 152 and leads to valve 175. Pipe or tubing 176 and 177 leads to the luer-lock valve assemblies on which syringe bodies 161 and 162 are coupled.

Assembly 150 includes pivoting brackets 154 and 155 that are held in place via thumb screw assemblies 156 and 157. Brackets 154 and 155 tightly hold fill chamber 152 in place relative to the housing assembly. Half round housing structure 162 holds the fill chamber in place when brackets 154 and 155 are tightened down against the fill chamber.

In order to replace the wetted parts (i.e., replace assembly 140), knurled couplings 116 and 132 are turned counter-clockwise to release end 114 of plunger assembly 100 from the stepper motor lead screw. Brackets 154 and 155 are then released and swung open. Valves 172 and 175 are closed. The inlet line is removed from coupling 171. The entire assembly 140 can then be lifted out of the enclosure and replaced with another similar assembly that is adapted to be used with a different fluid. When that replacement assembly is in place, valve 172 is opened and air is purged from the fill chamber (as necessary) as described above. Valve 175 can then be opened. The fill chamber can then be operated to supply fluid to either a syringe stand or directly to other fluid dispensers as described elsewhere herein.

Figure 10:
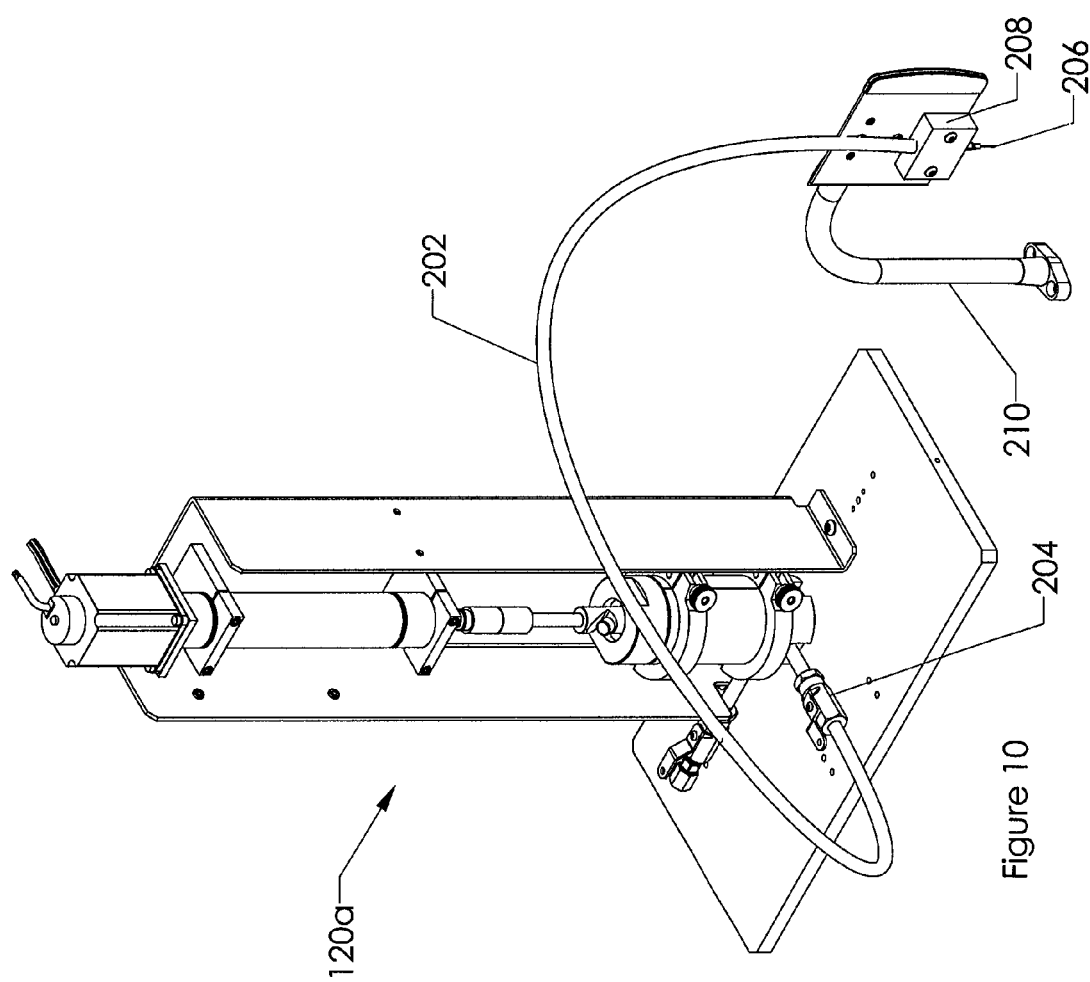
FIG. 10 shows a disclosed system using a different dispenser.

FIG. 10 shows system 120a in which the fill chamber directly dispenses fluid through a dispense tip 206 rather than the fill chamber feeding separate dispensing devices such as syringes as described above. Hose or line 202 runs from output control valve 204 to dispense tip 206, which may for example be a needle. Dispense tip 206 is held in place by mounting block 208, which is itself held on stand 210. This arrangement allows the fill chamber to be used as the dispenser, rather than the fill chamber being used to fill a separate dispenser.

A number of embodiments and options have been described herein. Modifications may be made without departing from the spirit and scope of the invention. For example, the Accordingly, other embodiments are within the claims.

What is claimed is:

1. A system for accurately delivering controlled amounts of viscous fluid from a fluid reservoir to one or more fluid delivery devices, comprising:
   a variable-volume fill chamber that defines a cavity that is adapted to contain the fluid;
   a movable plunger in the fill chamber cavity that can be moved within the cavity to vary the effective volume of the cavity;
   structure fluidly interconnecting the reservoir to the fill chamber;
   a device that automatically moves the plunger so as to dispense fluid from the fill chamber;
   structure fluidly interconnecting fluid flowing from the fill chamber to one or more fluid delivery devices; and
   a controller that automatically controls operation of the device that moves the plunger, to dispense a predetermined amount of fluid from the fill chamber to the fluid delivery devices;
   wherein the plunger defines a plunger body that carries a seal proximate its distal end that is located in the fill chamber cavity, and further defines a passageway in the plunger body that begins distally of the seal and terminates proximally of the seal, and further defines a selectively-operable valve in the passageway, wherein the valve can be opened to allow air to be bled from the cavity.

2. The system of claim 1 wherein the fluid delivery devices comprise syringes, and the fluid is an adhesive to be dispensed from the syringes.

3. The system of claim 2 further comprising a syringe stand that is constructed and arranged to releasably hold a plurality of syringes to be filled in syringe locations, and comprises a luer-activated valve associated with each syringe location.

4. The system of claim 3 wherein the syringe stand has a body and a plurality of luer-activated valves in the body in fluid communication with a fluid passage in the body, wherein the fluid passage terminates at two separate openings in the body, one used as a fluid inlet and one used as a fluid outlet.

5. The system of claim 1 further comprising a compressed air assist for conveying fluid from the reservoir to the fill chamber.

6. The system of claim 1 wherein the device that moves the plunger comprises a stepper motor with an output shaft that is adapted to be mechanically coupled to the plunger.

7. The system of claim 1 further comprising valving used to selectively allow and prevent fluid flow to and from the fill chamber, wherein the controller also automatically controls operation of some or all of the valving.

8. The system of claim 1 wherein the selectively-operable valve is a luer-activated valve.

9. The system of claim 8 wherein the plunger defines a releasable coupling at its proximal end that is adapted to be coupled to the device that moves the plunger.

10. The system of claim 1 wherein the structure fluidly interconnecting the reservoir to the fill chamber and the structure fluidly interconnecting fluid flowing from the fill chamber to one or more fluid delivery devices and the fill chamber and the plunger are all part of an interconnected fluid handling assembly, wherein the system further comprises a support structure that releasably supports and holds the fluid handling assembly such that it can be removed and replaced from the system as a unit.

11. A system for accurately delivering controlled amounts of viscous fluid from a fluid reservoir to one or more fluid delivery devices, comprising:
   a variable-volume fill chamber that defines a cavity that is adapted to contain the fluid;
   a movable plunger in the fill chamber cavity that can be moved within the cavity to vary the effective volume of the cavity, wherein the plunger defines a plunger body that carries a seal proximate its distal end that is located in the fill chamber cavity, and a releasable coupling at its distal end;
   a passageway defined in the plunger body that begins distally of the seal and terminates proximally of the seal;
   a selectively-operable valve in the passageway, wherein the valve can be opened to allow air to be bled from the cavity;
   structure fluidly interconnecting the reservoir to the fill chamber;
   a stepper motor with an output shaft that is adapted to be releasably mechanically coupled to the releasable coupling of the plunger, wherein the stepper motor is adapted to be automatically controlled to move the plunger so as to dispense fluid from the fill chamber;
   structure fluidly interconnecting fluid flowing from the fill chamber to one or more fluid delivery devices;
   valving used to selectively allow and prevent fluid flow to and from the fill chamber;
   a controller that automatically controls operation of the device that moves the plunger and also automatically controls operation of some or all of the valving, to dispense a predetermined amount of fluid from the fill chamber to the fluid delivery devices;
wherein the structure fluidly interconnecting the reservoir to the fill chamber, the structure fluidly interconnecting fluid flowing from the fill chamber to one or more fluid delivery devices, the fill chamber and the plunger are all part of an interconnected fluid handling assembly; and
a support structure that releasably supports and holds the fluid handling assembly such that it can be removed and replaced from the system as a unit.

12. A method of accurately delivering controlled amounts of viscous fluid from a fluid reservoir to one or more fluid delivery devices, comprising:
(i) providing a fluid fill system comprising:
a variable-volume fill chamber that defines a cavity that is adapted to contain the fluid;
a movable plunger in the fill chamber cavity that can be moved within the cavity to vary the effective volume of the cavity;
structure including one or more valves fluidly interconnecting the reservoir to the fill chamber;
a stepper motor that is controlled to automatically move the plunger so as to dispense fluid from the fill chamber;
structure including one or more valves fluidly interconnecting fluid flowing from the fill chamber to one or more fluid delivery devices; and
a controller that automatically controls operation of the stepper motor and at least some of the valves;
(ii) using the controller to automatically control the valves so as to:
open valves used to channel fluid flow from the reservoir to the fill chamber, and close valves used to channel fluid flow from the fill chamber to a fluid delivery device; and
once the fluid delivery device has been filled, close valves used to channel fluid flow from the reservoir to the fill chamber, and open valves used to channel fluid flow from the fill chamber to a fluid delivery device;
(iii) while the valves used to channel fluid flow from the fill chamber to a fluid delivery device are open, using the controller to operate the stepper motor to move the plunger to expel fluid from the fill chamber, so as to move fluid into the fluid delivery devices;
wherein the plunger defines a plunger body that carries a seal proximate its distal end that is located in the fill chamber cavity, and further defines a passageway in the plunger body that begins distally of the seal and terminates proximally of the seal, and further defines a selectively-operable valve in the passageway, wherein the valve can be opened to allow air to be bled from the cavity.

13. The method of claim 12 wherein the selectively-operable valve is a luer-activated valve.

14. The method of claim 13 wherein the plunger defines a releasable coupling at its proximal end that is adapted to be coupled to an output shaft of the stepper motor.

15. The method of claim 14 wherein the structure fluidly interconnecting the reservoir to the fill chamber, the structure fluidly interconnecting fluid flowing from the fill chamber to one or more fluid delivery devices, the fill chamber, and the plunger are all part of an interconnected fluid handling assembly, wherein the fluid fill system further comprises a support structure that releasably supports and holds the fluid handling assembly such that it can be removed and replaced from the system as a unit.

16. A system for accurately delivering controlled amounts of viscous fluid from a fluid reservoir to one or more fluid delivery devices, comprising:
a variable-volume fill chamber that defines a cavity that is adapted to contain the fluid;
a movable plunger in the fill chamber cavity that can be moved within the cavity to vary the effective volume of the cavity;
structure fluidly interconnecting the reservoir to the fill chamber;
a device that automatically moves the plunger so as to dispense fluid from the fill chamber;
structure fluidly interconnecting fluid flowing from the fill chamber to one or more fluid delivery devices;
a controller that automatically controls operation of the device that moves the plunger, to dispense a predetermined amount of fluid from the fill chamber to the fluid delivery devices wherein the fluid delivery devices comprise syringes, and the fluid is an adhesive to be dispensed from the syringes; and
a syringe stand that is constructed and arranged to releasably hold a plurality of syringes to be filled in syringe locations, and comprises a luer-activated valve associated with each syringe location.

17. The system of claim 16, wherein the syringe stand has a body and a plurality of luer-activated valves in the body in fluid communication with a fluid passage in the body, wherein the fluid passage terminates at two separate openings in the body, one used as a fluid inlet and one used as a fluid outlet.

* * * * *